(12) United States Patent
Kleen et al.

(10) Patent No.: US 10,766,498 B2
(45) Date of Patent: Sep. 8, 2020

(54) METHOD, APPARATUS, AND COMPUTER READABLE STORAGE MEDIUM HAVING INSTRUCTIONS FOR CONTROLLING A DISPLAY OF AN AUGMENTED REALITY DISPLAY DEVICE FOR A TRANSPORTATION VEHICLE

(71) Applicant: VOLKSWAGEN AKTIENGESELLSCHAFT, Wolfsburg (DE)

(72) Inventors: Andro Kleen, Braunschweig (DE); Daniel Morales Fernández, Terrassa (ES); Adrian Benjamin Haeske, Wolfsburg (DE); Adrian Haar, Wolfsburg (DE); Vitalij Sadovitch, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/123,221

(22) Filed: Sep. 6, 2018

(65) Prior Publication Data

US 2019/0077417 A1 Mar. 14, 2019

(30) Foreign Application Priority Data

Sep. 12, 2017 (DE) ........................ 10 2017 216 100

(51) Int. Cl.
*B60W 50/14* (2020.01)
*G06K 9/00* (2006.01)
*G08G 1/16* (2006.01)
*G08G 1/0962* (2006.01)
(Continued)

(52) U.S. Cl.
CPC ............. *B60W 50/14* (2013.01); *B60K 35/00* (2013.01); *B60Q 9/008* (2013.01); *B60R 1/00* (2013.01);
(Continued)

(58) Field of Classification Search
None
See application file for complete search history.

(56) References Cited

U.S. PATENT DOCUMENTS 9,514,650 B2 * 12/2016 Ng-Thow-Hing ..... G08G 1/166
10,089,872 B1 * 10/2018 Beaurepaire .......... G08G 1/146
(Continued)

FOREIGN PATENT DOCUMENTS

DE 102009004432 A1 7/2009
DE 102011120878 A1 6/2013
(Continued)

OTHER PUBLICATIONS

Johansson; Visual perception of biological motion and a model for its analysis; Perception & Psychophysics; 1973; pp. 201-211; vol. 14, No. 2.
(Continued)

*Primary Examiner* — Michael J Cobb
(74) *Attorney, Agent, or Firm* — Barnes & Thornburg LLP

(57) ABSTRACT

A method, a device, and a computer-readable storage medium with instructions for controlling a display of an augmented reality display device for a transportation vehicle. The presence of a driving situation is detected, in which a warning is displayed to a driver of the transportation vehicle; the augmented reality display device generates a virtual object for display; the virtual object visualizes potential imminent events, actions or dangerous situations; the virtual object has moving graphical elements that simulate a movement of the virtual object; and the augmented reality display device outputs the generated virtual object for display.

25 Claims, 7 Drawing Sheets

(51) Int. Cl.
    *G01C 21/36*     (2006.01)
    *B60K 35/00*     (2006.01)
    *G02B 27/01*     (2006.01)
    *G06T 19/00*     (2011.01)
    *B60Q 9/00*     (2006.01)
    *B60R 1/00*     (2006.01)
    *B60W 30/095*     (2012.01)

(52) U.S. Cl.
    CPC ......... *G01C 21/3697* (2013.01); *G02B 27/01* (2013.01); *G06K 9/00671* (2013.01); *G06K 9/00805* (2013.01); *G06T 19/006* (2013.01); *G08G 1/0962* (2013.01); *G08G 1/166* (2013.01); *B60K 2370/1529* (2019.05); *B60K 2370/177* (2019.05); *B60K 2370/178* (2019.05); *B60R 2300/205* (2013.01); *B60R 2300/308* (2013.01); *B60W 30/0956* (2013.01); *B60W 2050/146* (2013.01); *G02B 2027/0141* (2013.01)

(56) References Cited

U.S. PATENT DOCUMENTS

| | | | |
|---|---|---|---|
| 10,573,183 B1* | 2/2020 | Li | G08G 1/005 |
| 2010/0265345 A1 | 10/2010 | Andersson | |
| 2014/0354684 A1* | 12/2014 | Beckwith | G06F 3/011 |
| | | | 345/633 |
| 2015/0243171 A1 | 8/2015 | Emura et al. | |
| 2016/0019786 A1* | 1/2016 | Yoon | G08G 1/0962 |
| | | | 340/905 |
| 2016/0325676 A1* | 11/2016 | Yamada | B60Q 9/008 |
| 2017/0136878 A1* | 5/2017 | Frank | B60W 50/14 |
| 2018/0029612 A1* | 2/2018 | Tsuyunashi | B60W 30/095 |
| 2018/0322783 A1* | 11/2018 | Toyoda | G06T 13/80 |
| 2019/0077417 A1* | 3/2019 | Kleen | G06K 9/00671 |
| 2019/0259284 A1* | 8/2019 | Khadloya | G06T 7/97 |
| 2019/0355256 A1* | 11/2019 | Bielby | G08G 1/04 |

FOREIGN PATENT DOCUMENTS

| | | |
|---|---|---|
| KR | 20160050037 A | 5/2016 |
| WO | 2017019725 A1 | 2/2017 |

OTHER PUBLICATIONS

Search Report for European Patent Application No. 18188085.7; dated Feb. 1, 2019.

\* cited by examiner

METHOD, APPARATUS, AND COMPUTER READABLE STORAGE MEDIUM HAVING INSTRUCTIONS FOR CONTROLLING A DISPLAY OF AN AUGMENTED REALITY DISPLAY DEVICE FOR A TRANSPORTATION VEHICLE

PRIORITY CLAIM

This patent application claims priority to German Patent Application No. 10 2017 216 100.0, filed 12 Sep. 2017, the disclosure of which is incorporated herein by reference in its entirety.

SUMMARY

Illustrative embodiments relate to a method, a device and a computer-readable storage medium with instructions for controlling a display of an augmented reality display device for a transportation vehicle. Illustrative embodiments also relate to a transportation vehicle, in which the disclosed method or the disclosed device is used.

BRIEF DESCRIPTION OF THE DRAWINGS

Disclosed embodiments are derived from the following description and the appended claims in conjunction with the figures, in which.

DETAILED DESCRIPTION

Figure 1:
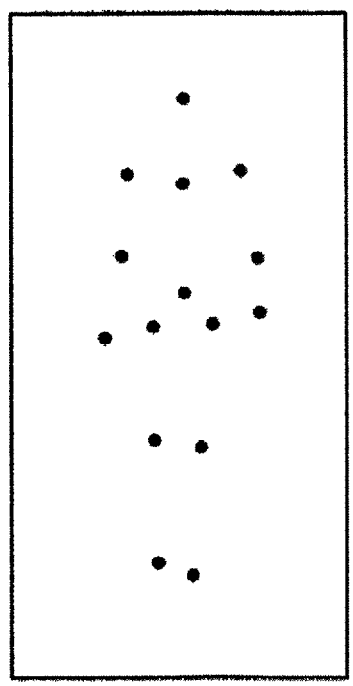
FIG. 1 shows a representation of a human person as a group of light points.

With the constant advances in the development of virtual and augmented reality technologies and augmented reality applications, these are also attracting interest in the automotive sector. In augmented reality (AR), the real world is enriched using virtual elements which are registered in three-dimensional space in a spatially accurate way and allow a real-time interaction. Since in the German-speaking world the expression "Augmented Reality" has become established in professional usage in preference to the equivalent German expression, the former will be used hereafter.

A possible technical solution to augmenting the driver's workspace with perspectively correct virtual augmentations is provided by the Head-Up Display (HUD). In this device, the light beams from a display fitted in the dashboard are deflected via a plurality of mirrors and lenses and reflected via a projection surface into the eye of the driver, so that the driver perceives a virtual image outside the transportation vehicle. In automotive applications the windshield is often used as the projection surface, the curved shape of which should be taken into account in the image display. As an alternative, an additional sheet of glass or plastic is also sometimes used, arranged on the dashboard between the driver and the windshield. The optical superposition of display and driving scene means that fewer head and eye movements are necessary to take in the information. In addition, the adaptation effort for the eyes is reduced, because depending on the distance of the virtual display there is less or no need at all to accommodate.

Current production head-up displays, however, are limited to displays directly under the primary field of vision of the driver and contain redundant information, such as the speedometer display, which is also available in another position in the cockpit. While this display technology does reduce the need to divert the driver's gaze away from the road, it still has the drawback that the information presented should be interpreted and transferred onto the real situation, since the information is not registered in the real scene. In complex situations this can represent a mentally demanding cognitive process. By highlighting objects and overlaying information at its actual reference position, i.e., using a contact-analog display, environment-related information can be displayed directly in the driver's field of vision. This direct graphical enrichment of the environment, such as, augmented reality, can significantly reduce the cognitive transfer requirements. In addition to the implementation of augmented reality representations by a head-up display it is also possible to display similar virtual augmentations in the transportation vehicle mirrors, i.e., in the rear-view mirror or the wing mirrors. Virtual augmentations can also be included in the displays of a reversing camera or other types of camera.

With the introduction of powerful sensor technologies, the problem arises that important types of information about the environment and the traffic are technically available, but there is a lack of effective ways of communicating this information in a manageable and easily comprehensible way. Augmented reality offers completely new possibilities in this regard, because information can be displayed directly in the environment. Despite the fact that such information can be processed much more intuitively than previously, the user-friendly compatibility of the display concepts is nevertheless an important goal.

The top priority here should always be a reasonable level of demand on the attention or information processing of the driver. Any additional loading of these cognitive processes, for example, by displays that require significant effort to interpret and are difficult to understand, should be avoided at all costs. This is even more true in the case of displays that are designed to be used in a prominent position, in the driver's primary field of vision. For augmented reality applications this raises the question as to how the display concepts should be designed to achieve low-resource information processing.

An interesting possibility is offered by the use of natural movement patterns which can be summarized under the term "Biological motion" [1]. The aim of this concept is to address the human perceptual system in a conventional and familiar way. The use of biologically grounded patterns offers a range of benefits, which are based mainly on a very low-level and thus very fast interpretation performance.

In the presentation of "biological motion" patterns, for example, human or animal movements are displayed using a manageable number of graphical elements. It turns out that people are able to effortlessly recognize this small number of stimuli or movements as human beings, for example. Moreover, test subjects are even able to identify details, such as the gender or the weight of a person. This approach is suitable for use in augmented reality applications.

Against this background, DE 10 2011 120 878 A1, for example, describes a method for generating a virtual partial image on an image display unit of a transportation vehicle. An image acquisition detection device of the transportation vehicle is used to detect an environment of the transportation vehicle. The recorded image data are evaluated for the detection of a living organism. To enable a detected organism to be perceived by a transportation vehicle occupant, in its field of view a display position of the detected organism is highlighted on the image display unit by the virtual partial image. To highlight the organism an ordered group of points of light executing a movement is generated, wherein the points of light represent at least the locations of several parts of the body of a body shape corresponding to the detected organism.

US 2015/0243171 A1 describes a method for generating a display for a display device of a transportation vehicle, such as a head-up display. A detection unit receives an image in the direction of travel, which represents the view of the driver of the transportation vehicle facing forwards. The detection unit then extracts a feature which is contained in the image, and detects a predefined object on the basis of the extracted feature. If the detected object is a person, this person is displayed on the display device as a moving figure of points of light.

WO 2017/019725 A1 describes, among other things, a method for generating a display of a head-up display. To improve the visibility of objects within a scene in the head-up display, a pedestrian who may be present in an illuminated scene, such as within a visual field of a headlight, can be emphasized by being overlaid with a moving light-point figure in the head-up display.

It is assumed that the virtual projection surfaces of modern head-up display systems will also only cover a relatively small part of the windshield. This results, among other things, in a problem for warnings about pedestrian collisions. If, for example, pedestrians are located very far to the right, thus still outside the virtual projection surface, these can be perceived by the transportation vehicle sensors, but cannot be highlighted by an augmented reality display. It is also conceivable that a person remains completely hidden, for example, by a row of houses, but a potential collision can be predicted on the basis of available information. In both cases, the problem arises that the current and future position of a pedestrian are known, but without them reaching the actual projection area.

Disclosed embodiments describe solutions for an improved control of a display of an augmented reality display device for a transportation vehicle.

This is achieved by a method, by a computer-readable storage medium with instructions, and by a device.

According to a first disclosed embodiment, a method for controlling a display of an augmented reality display device for a transportation vehicle comprises: detecting a driving situation in which a warning is to be displayed to a driver of the transportation vehicle; generating a virtual object for display by the augmented reality display device, wherein the virtual object is used to visualize potential imminent events, actions or dangerous situations and the virtual object has moving graphical elements that simulate a movement of the virtual object; and outputting the virtual object for display by the augmented reality display device.

According to a further disclosed embodiment, a computer-readable storage medium contains instructions, which when executed by a computer cause the computer to execute the following operations for controlling a display of an augmented reality display device for a transportation vehicle: detecting a driving situation in which a warning is to be displayed to a driver of the transportation vehicle; generating a virtual object for display by the augmented reality display device, wherein the virtual object is used to visualize potential imminent events, actions or dangerous situations and the virtual object has moving graphical elements that simulate a movement of the virtual object; and outputting the virtual object for display by the augmented reality display device.

The term computer used here is to be interpreted broadly. It also comprises control devices and other processor-based data processing devices.

According to a further disclosed embodiment, a device for controlling a display of an augmented reality display device for a transportation vehicle comprises: an analysis unit for detecting a driving situation in which a warning is to be displayed to a driver of the transportation vehicle; a graphics generator for generating a virtual object for display by the augmented reality display device, wherein the virtual object is used to visualize potential imminent events, actions or dangerous situations and the virtual object has moving graphical elements that simulate a movement of the virtual object; and an output for outputting the virtual object for display by the augmented reality display device.

A facility is provided for warning of potential imminent events, actions or dangerous situations, by a virtual object which has moving graphical elements. By the use of moving graphic elements it is possible to implement natural movement patterns that can be by intuitively grasped by the driver. This solution is not limited to the highlighting of objects that are already present in the field of vision of the driver, but also comprises the representation of objects which can only be detected, for example, by a transportation vehicle sensor device and are not yet visible to the driver. For example, a trajectory, a speed or a future position an object that is not yet visible can be anticipated. This object-independent positioning and anticipation can also be used, in spite of the limited display area of head-up displays, to visualize the trajectory of an object which is not yet in the area of the head-up display available for augmentation.

The disclosed solution can also be used in automatic driving. For example, images of running children can be displayed as justification for slowing down during automatic driving. Any system actions are therefore transparent and comprehensible. This approach has a positive effect on the confidence of drivers, which promotes the use and the purchasing attractiveness of automatically driven transportation vehicles.

In accordance with at least one disclosed embodiment, the moving graphical elements form a group of light points which simulates a real object. For example, the group of light points can simulate a person. In this way, human movements therefore become visible to the driver within the display of the head-up display, without a person actually being present in front of the transportation vehicle or even a person needing to be visible. Due to the natural movement patterns and perceptual processes, the driver can therefore be warned about the presence of a person in an intuitive way, so as to avoid a collision. In a similar way, warnings can also be given about animals, transportation vehicles or other objects. Thus, a consistent and subtle design language is produced, which allows the driver to better anticipate upcoming events.

In accordance with at least one disclosed embodiment, the virtual object represents an actual or potential hazardous object in the environment of the transportation vehicle. The actual hazardous object can be, for example, a road user, in particular, a pedestrian, a cyclist or a transportation vehicle. Likewise, the actual hazardous object can be an animal or other obstacle. The driver can therefore be warned of the presence of really existing hazardous objects in the environment of the transportation vehicle that may possibly lead to a dangerous traffic situation. The driver can then react with the necessary attention.

In addition to the display of real existing objects, which can at least potentially lead to a dangerous traffic situation, potentially hazardous objects can also be displayed. The potentially hazardous object can be, for example, a road user or an obstacle. The display of potential hazardous objects can be used to warn of potentially dangerous traffic situations without the presence of a real hazardous object, so that the driver can act with appropriate caution. For example, the display of a running animal can be used to warn about a section of road where there is a risk of wildlife crossing. A display of playing children can illustrate the proximity of a school, a bouncing ball can indicate a traffic-calmed road where games might be played.

In accordance with at least one disclosed embodiment, a position or a movement of the virtual object does not coincide with the position or movement of an actual hazardous object. In the event that the actual hazardous object is not yet visible or not yet located in the augmentation-enabled area of the display, the position of the virtual object may not coincide with the position of the actual hazardous object from the outset. But even in the case of an actual hazardous object which is already in the augmentation-enabled area of the display, for example, an expected trajectory of a movement of the hazardous object can be illustrated in this way. It is also conceivable that, for example, a transportation vehicle which is about to start is augmented by a display of rotating wheels, even before the start of the movement. In this case, the position of the virtual object may indeed coincide with the position of the wheel, but the virtual object is already simulating a movement while the wheel is still stationary.

In accordance with at least one disclosed embodiment, the virtual object represents a driving instruction. Through the use of appropriate gestures which are performed, for example, by light point figures, driving instructions can be given to the driver. The types of movements that can be implemented are those which assist in, for example, following the instructions of a navigation device or a parking and maneuvering aid. In the event of an emergency, evasive actions can also be displayed.

One example of an implementation of this approach is that of virtual human guides. Here "biological motion" figures can be positioned, for example, at intersections and indicate the road or turning to be chosen with waving or pointing gestures. Such figures can also be used to provide guidance in parking or maneuvering operations using appropriate movements and gestures. In this case, it is beneficial to provide augmentations in the mirrors as well, i.e., in the rear-view mirror or the wing mirrors. This can be used in the commercial transportation vehicle sector to provide effective assistance in the sometimes very complex parking and positioning maneuvers.

In accordance with at least one disclosed embodiment, the augmented reality display device has a head-up display or a display in at least one mirror of the transportation vehicle. A head-up display is ideally suited to convey the desired information to the driver, without diverting the driver's attention away from the road. Displays in the mirrors are beneficial for displaying driving directions in parking and positioning maneuvers.

In accordance with at least one disclosed embodiment, the detection of a driving situation in which a warning is to be displayed for a driver of the transportation vehicle takes place on the basis of data from a sensor device of the transportation vehicle, on the basis of navigation information or of information received by a data transmission unit. A plurality of driving situations in which information is to be displayed can be identified directly on the basis of the information collected in the transportation vehicle. Actual hazardous objects in the environment of the transportation vehicle can be detected by the transportation vehicle sensors, for example, using a camera or lidar, radar or ultrasonic sensors. In addition, hazardous situations can also be identified on the basis of information that has been provided from external sources and received by a data transmission unit. Examples of external sources are, e.g., other road users or else service providers. Potentially hazardous objects, for example, as a result of wildlife crossings or the presence of a school, as well as driving instructions can also be identified from the available navigation information with little effort.

A disclosed method or a disclosed device may be used in a transportation vehicle.

For a better understanding of the principles of the disclosure, embodiments are described in more detail below by reference to the figures. This disclosure is not limited to these embodiments and that the described features can also be combined or modified without departing from the scope of protection of the disclosure, as it is defined in the appended claims.

FIG. 1 shows a representation of a human person as a group of light points, wherein the individual points of light are shown here in black. Although this involves only a minimal amount of information based on only 15 points, people easily recognize the person represented in them, in particular, when animated movements are shown. These approaches to biological movement are associated with very rapid, hence natural, information processing. In the following, they will be related to application cases in the automotive sector.

Figure 2:
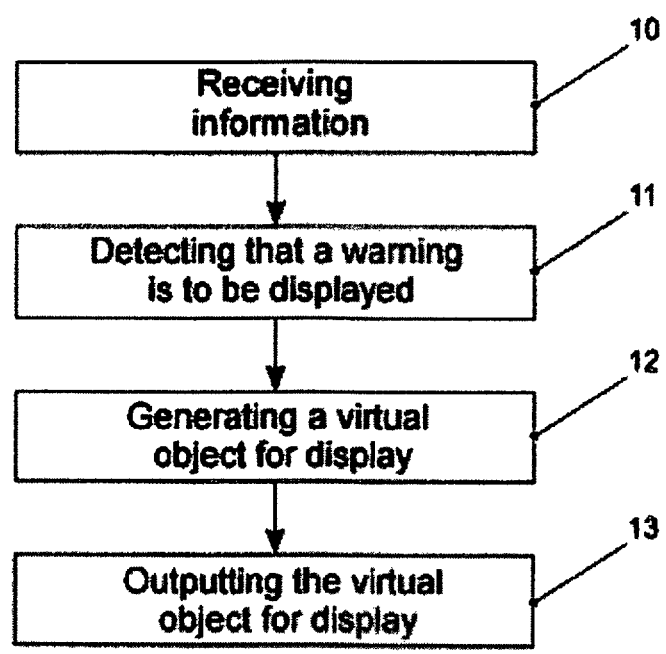
FIG. 2 shows a schematic view of a method for controlling a display of an augmented reality display device for a transportation vehicle.

FIG. 2 shows a schematic view of a method for controlling a display of an augmented reality display device for a transportation vehicle, such as a head-up display or a display in at least one mirror of the transportation vehicle. In a first operation, information is received 10, for example, sensor data, navigation data or hazard information. On the basis of the received information, the presence of a driving situation is detected 11, in which a warning is to be displayed to a driver of the transportation vehicle. A virtual object is then generated for display by the augmented reality display device 12. By the virtual object, potential upcoming events, actions or dangerous situations are visualized. The virtual object has moving graphical elements that simulate a movement of the virtual object. For example, the moving graphical elements form a group of light points which simulates a real object. The generated virtual object is finally output 13 for display by the augmented reality display device. Optionally, the virtual object represents an actual or potential hazardous object in the environment of the transportation vehicle, for example, a road user or an obstacle. The virtual object can also represent a driving instruction, however.

Figure 3:
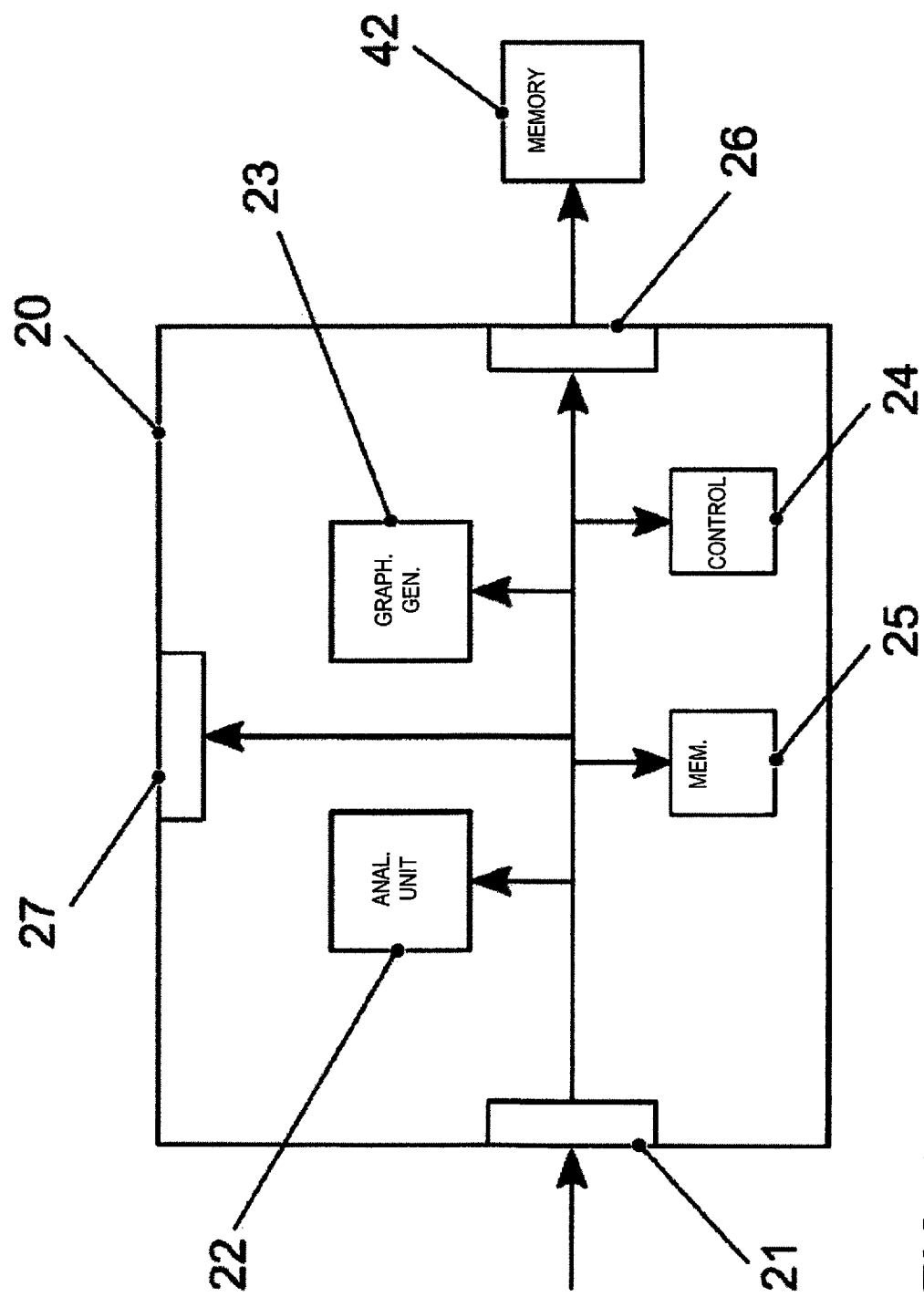
FIG. 3 shows a first embodiment of a device for controlling a display of an augmented reality display device for a transportation vehicle.

FIG. 3 shows a simplified schematic representation of a first disclosed embodiment of a device 20 for controlling a display of an augmented reality display device for a transportation vehicle, such as a head-up display or a display in at least one mirror of the transportation vehicle. The device 20 has an input 21, via which information can be received, for example, sensor data, navigation data or hazard information. The device 20 also has an analysis unit 22, which on the basis of the information received detects a driving situation in which a warning for a driver of the transportation vehicle is to be displayed. A graphics generator 23 generates a virtual object for display by the augmented reality display device, wherein the virtual object is used to visualize potential imminent events, actions or dangerous situations. The virtual object has moving graphical elements that simulate a movement of the virtual object. For example, the moving graphical elements form a group of light points, which simulates a real object. Via an output 26 of the device 20, the generated virtual object is output to a control device 42 of the augmented reality display device. Alternatively, it is possible to only output an instruction to the control device 42 to generate a corresponding virtual object. The control device 42 can then insert the generated virtual object into a display of the augmented reality display device. Optionally, the virtual object represents an actual or potential hazardous object in the environment of the transportation vehicle, for example, a road user or an obstacle. The virtual object can also represent a driving instruction, however.

The analysis unit 22 and the graphics generator 23 can be controlled by a control unit 24. Via a user interface 27, if necessary, settings of the analysis unit 22, the graphics generator 23 or the control unit 24 can be changed. The data produced in the device 20 can if necessary also be stored in a memory 25 of the device 20, for example, for later analysis or for use by the components of the device 20. The analysis unit 22, the graphics generator 23 and the control unit 24 can be implemented as dedicated hardware, for example, as integrated circuits. But they can also be partially or completely combined, or implemented as software running on a suitable processor, for example, on a GPU. The input 21 and the output 26 can be implemented as separate interfaces or as a combined bi-directional interface. In the example described, the device 20 is a stand-alone component. However, it can also be integrated in the control device 42 of the augmented reality display device.

Figure 4:
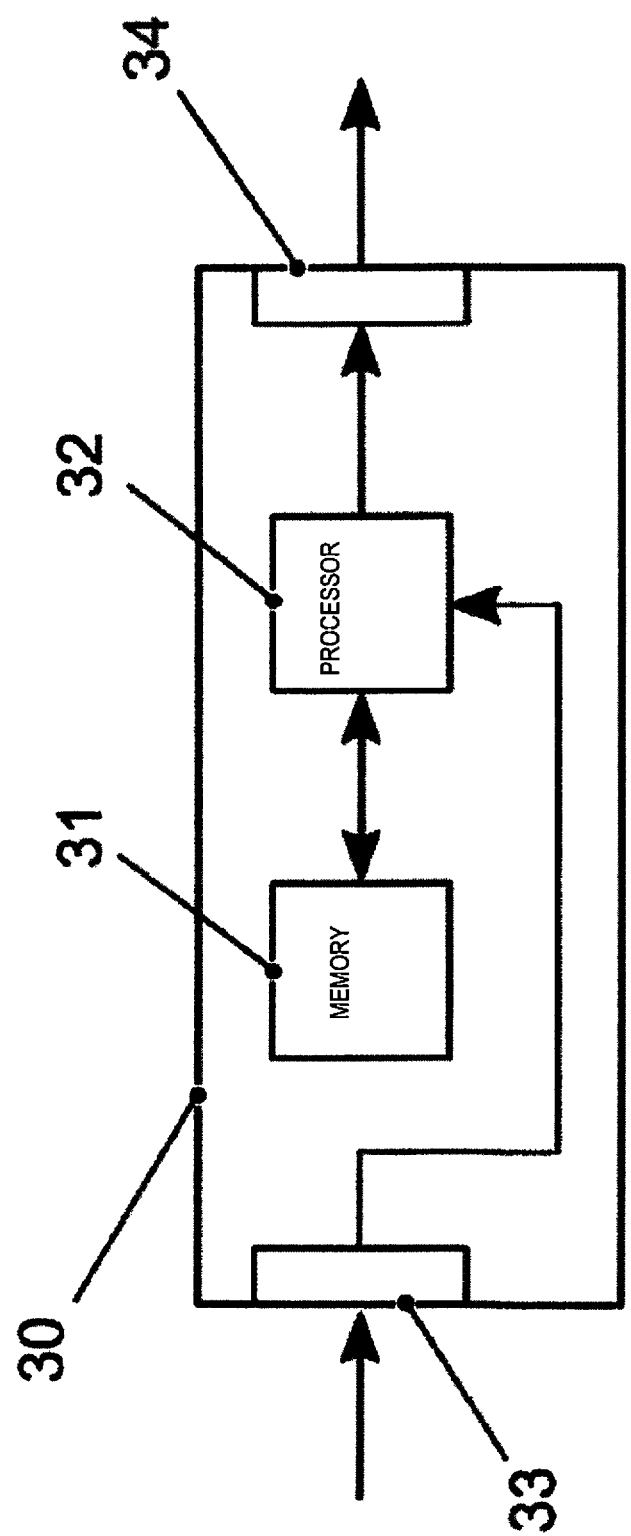
FIG. 4 shows a second embodiment of a device for controlling a display of an augmented reality display device for a transportation vehicle.

FIG. 4 shows a simplified schematic representation of a second disclosed embodiment of a device 30 for controlling a display of an augmented reality display device for a transportation vehicle. The device 30 comprises a processor 32 and a memory 31. For example, the device 30 is a computer or a control device. Instructions are stored in the memory 31, which when executed by the processor 32 cause the apparatus 30 to execute the operations according to one of the disclosed methods. The instructions stored in the memory 31 thus embody a program that can be executed by the processor 32, which implements the disclosed method. The device 30 has an input 33 for receiving information, for example, sensor data, navigation data or hazard information. Data generated by the processor 32 are provided via an output 34. In addition, they can be stored in the memory 31. The input 33 and the output 34 can be combined to form a bi-directional interface.

The processor 32 can comprise one or more processor units, for example, microprocessors, digital signal processors, or combinations of these.

The memories 25, 31 of the disclosed embodiments described can have both volatile and non-volatile memory areas and comprise a wide variety of storage devices and storage media, such as hard drives, optical storage media or semiconductor memories.

Figure 5:
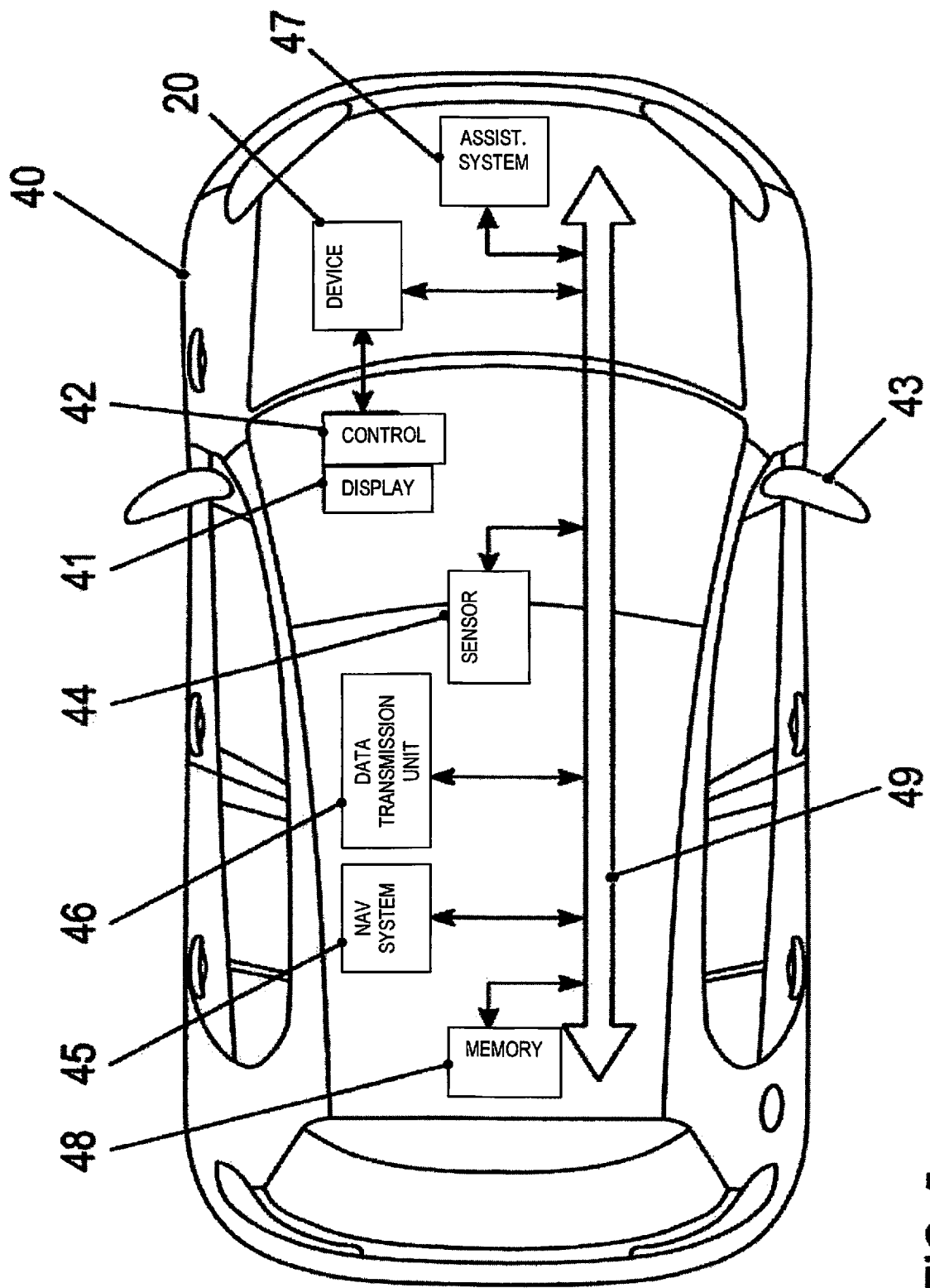
FIG. 5 is a schematic representation of a transportation vehicle, in which a disclosed solution is realized.

FIG. 5 is a schematic representation of a transportation vehicle 40, in which a solution is realized. The transportation vehicle 40 has an augmented reality display device 41 with a corresponding control device 42. The augmented reality display device 41 can be, for example, a head-up display device. In addition, however, the augmented reality display device 41 can also comprise displays in the mirrors of the transportation vehicle 40, for example, in the wing mirrors 43. Furthermore, the transportation vehicle 40 has a device 20 for controlling a display of the augmented reality display device 41. The device 20 can also be integrated in the augmented reality display device 41 or in the control device 42 of the augmented reality display device 41. Other components of the transportation vehicle 40 are a sensor device 44 for the detection of hazardous objects, a navigation system 45, a data transmission unit 46, and a range of assistance systems 47, an example of one of which is shown. Using the data transmission unit 46, a connection can be established to service providers, for example, for retrieving map data or information on hazards. A memory 48 is provided for storing data. The exchange of data between the various components of the transportation vehicle 40 is carried out via a network 49. The sensor device 44 can comprise, for example, a camera and lidar, radar or ultrasound sensors.

Figure 6:
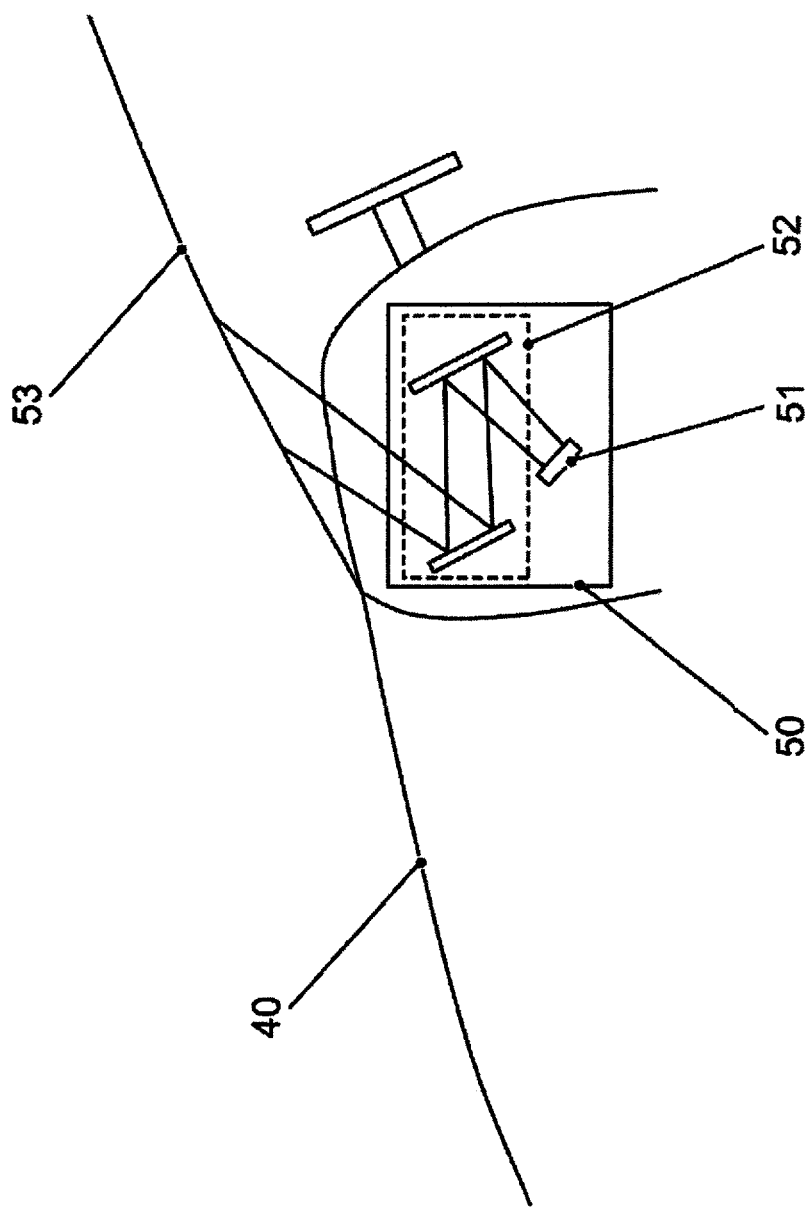
FIG. 6 shows a schematic view of the general structure of a head-up display device for a transportation vehicle.

FIG. 6 shows, as an example of an augmented reality display device, a schematic view of a head-up display device 50 for a transportation vehicle 40, which can be used to display content on a projection area 53 of the transportation vehicle 40, for example, on the front windshield or on an additional sheet made of glass or plastic, which is arranged on the dashboard between the driver and the windshield. The displayed contents are generated by an imaging unit 51 and projected onto the projection area 53 by an optical module 52. Typically, the projection takes place in an area of the windshield above the steering wheel. The imaging unit 51 can be, for example, an LCD TFT display. The head-up display device 50 is normally installed in a dashboard of the transportation vehicle 40.

Figure 7:
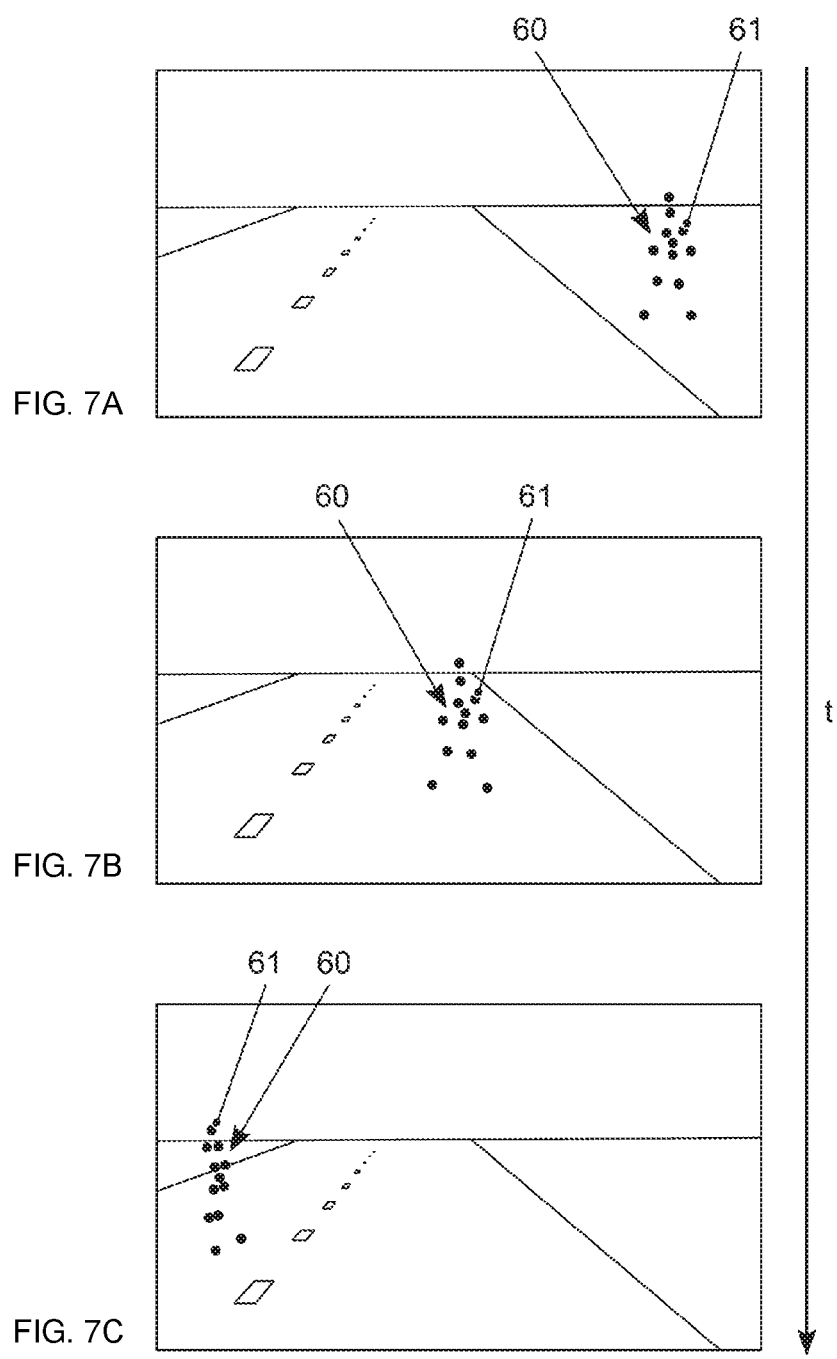
FIGS. 7A-C show a first example of a visualization of an actual hazardous object in an augmented reality display.

FIG. 7 shows a first example of a visualization of an actual hazardous object using a virtual object 60 in an augmented reality display within a head-up display. The images show the temporal evolution of the virtual object 60 based on three successive points in time. The actual hazardous object in this example is a person, who is either still completely hidden or at least located outside of the virtual projection area of the head-up display. By the virtual object 60, which is composed of moving graphical elements 61, a person crossing the road is visualized. The walking figure is easily interpretable as a human being and contributes to the indication of the presence of the person and the associated hazard. Obstacles can also be visualized in a similar way, for example, a ball rolling onto the road or an object protruding into the road.

The approach presented in FIG. 7 can also be used in less critical situations. An example of this is raising the awareness of the driver of specific locations, such as zebra crossings, bus stops or schools. In these cases, the "biological motion" figures can be, for example, crossing a road without an actual person being present. Potential hazardous objects are therefore displayed. The display of the figures can be oriented towards the particular conditions, for example, by displaying running children near to schools. To prevent strong driver reactions, it also possible to refrain from showing the artificial figures crossing the road. Instead, the animations can be positioned at the side of the road or on the sidewalk. In addition, care should be taken to ensure that at any given time it is obvious whether actual or only imaginary persons are being visualized. To this end, it may be useful if only one of the approaches described is implemented in the transportation vehicle, i.e., either only actual people or only imaginary figures are visualized.

A further, independent function is the facility to deliver relevant driving information about a particular section of the route in an intuitive way. For example, an area frequently affected by wildlife can be announced by the subtle indication of a virtual deer, which consists of points of light moving across the road. Similarly, in a walking speed zone, a virtual ball can roll across the road.

Figure 8:
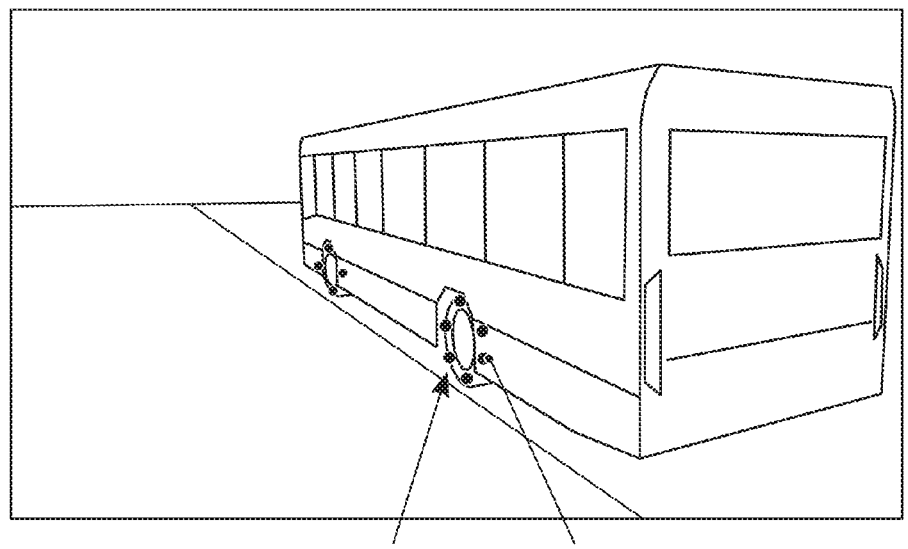
FIG. 8 shows a second example of a visualization of an actual hazardous object in an augmented reality display.

FIG. 8 shows a second example of a visualization of an actual hazardous object in an augmented reality display. The picture shows a stationary bus, which is at a bus stop. Shortly before the departure of the bus, circles formed by dots are displayed on the tires of the bus, which begin to turn. This announces the fact that the bus is starting very soon. This function can be used both in automatic as well as manual driving. The necessary information can originate both by car-to-car communication (data exchange between transportation vehicles), mobile data or from separate, sensor-based prediction algorithms. A further option is the display of appropriate tire movements of transportation vehicles that are still hidden.

Figure 9:
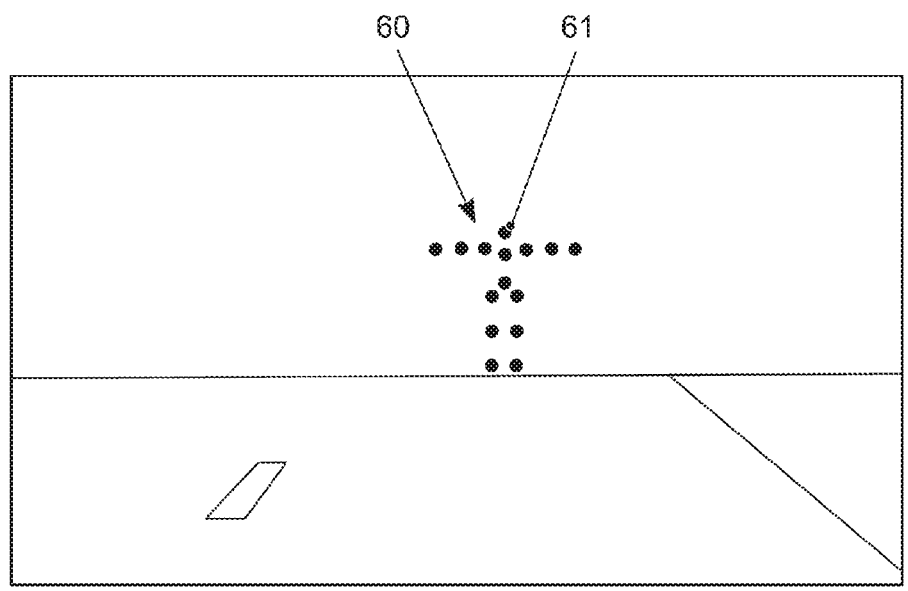
FIG. 9 shows an example of a visualization of a driving instruction in an augmented reality display.

FIG. 9 shows an example of a visualization of a driving instruction in an augmented reality display. The case illustrated is that of a no-entry restriction, expressed by an appropriate gesture of a "biological motion" figure. The types of movements that can be implemented here are those of a "virtual human guide", which assist a driver to follow the instructions of a navigation device or a parking and maneuvering aid. For example, corresponding "biological motion" figures can be positioned at intersections and indicate the road or turning to be chosen with waving or pointing gestures. Likewise, an emergency evasive maneuver can be visualized by such a figure.

Optionally, the warning and information concepts described above can be selected and parameterized by drivers. For example, a speed-dependent implementation of the concepts can be provided.

LIST OF REFERENCE NUMERALS 10 receiving information
11 detecting that a warning is to be displayed
12 generating a virtual object for display
13 outputting the virtual object for display
20 device
21 input
22 analysis unit
23 graphics generator
24 control unit
25 memory
26 output
27 user interface
30 device
31 memory
32 processor
33 input
34 output
40 transportation vehicle
41 augmented reality display device
42 control device of the augmented reality display device
43 external wing mirrors
44 sensor device
45 navigation system
46 data transmission unit
47 assistance system
48 memory
49 network
50 head-up display device
51 imaging unit
52 optical module
53 projection area
60 virtual object
61 graphical element

REFERENCES

[1] Johansson: "*Visual perception of biological motion and a model for its analysis*". Percept. Psychophys. Vol. 14 (1973), pp. 201-211

The invention claimed is:

1. A device for controlling a display of an augmented reality display device for a transportation vehicle, the device comprising:
an analysis unit for detecting a driving situation in which a warning is to be displayed to a driver of the transportation vehicle;
a graphics generator for generating virtual objects for display by the augmented reality display device, wherein the virtual objects have moving graphical elements which simulate movement of the virtual objects; and
an output for outputting the virtual objects for display by the augmented reality display device to enable visualization of possible imminent events, actions or hazardous situations via the augmented reality display device, wherein the virtual objects displayed on the augmented reality display device include representations of actual objects in an environment surrounding the vehicle, virtual objects that indicate an increased risk of objects depicted by the virtual objects actually being present in the environment surrounding the transportation vehicle, and virtual objects providing instruction for the driver to drive the transportation vehicle to position the transportation vehicle relative to locations within the environment surrounding the transportation vehicle so as to assist the driver to follow transportation vehicle navigation instructions issued by a navigation system of the transportation vehicle or parking maneuvering assistance instructions generated by the transportation vehicle.

2. The device of claim 1, wherein the moving graphical elements form a group of light points that form a virtual object.

3. The device of claim 1, wherein at least one of the virtual objects represents an actual or potential hazardous object in the environment of the transportation vehicle.

4. The device of claim 3, wherein a position or a movement of the at least one virtual object representing the actual or potential hazardous object does not coincide with a position or movement of an actual hazardous object.

5. The device of claim 3, wherein the actual hazardous object is a road user or an obstacle.

6. The device of claim 3, wherein the potential hazardous object is a road user or an obstacle.

7. The device of claim 1, wherein the augmented reality display device has a head-up display or a display in at least one mirror of the transportation vehicle.

8. The device of claim 1, wherein the detection of the driving situation is based on data from a sensor device of the transportation vehicle, based on navigation information or based on information received by a data transmission unit.

9. A transportation vehicle with an augmented reality display device, wherein the transportation vehicle includes the device of claim 1 for controlling a display of the augmented reality display device.

10. A method for controlling a display of an augmented reality display device for a transportation vehicle, the method comprising:
    detecting a driving situation in which a warning is to be displayed to a driver of the transportation vehicle;
    generating virtual objects for display by the augmented reality display device, wherein the virtual objects have moving graphical elements which simulate movement of the virtual objects; and
    outputting the virtual objects for display by the augmented reality display device to enable visualization of possible imminent events, actions or hazardous situations via the augmented reality display device,
    wherein the virtual objects displayed on the augmented reality display device include representations of actual objects in an environment surrounding the vehicle, virtual objects that indicate an increased risk of objects depicted by the virtual objects actually being present in the environment surrounding the transportation vehicle, and virtual objects providing instruction for the driver to drive the transportation vehicle to position the transportation vehicle relative to locations within the environment surrounding the transportation vehicle so as to assist the driver to follow transportation vehicle navigation instructions issued by a navigation system of the transportation vehicle or parking maneuvering assistance instructions generated by the transportation vehicle.

11. The method of claim 10, wherein the moving graphical elements form a group of light points that form a virtual object.

12. The method of claim 10, wherein at least one of the virtual objects represents an actual or potential hazardous object in the environment of the transportation vehicle.

13. The method of claim 12, wherein a position or a movement of the at least one virtual object representing the actual or potential hazardous object does not coincide with a position or movement of an actual hazardous object.

14. The method of claim 12, wherein the actual hazardous object is a road user or an obstacle.

15. The method of claim 12, wherein the potential hazardous object is a road user or an obstacle.

16. The method of claim 10, wherein the augmented reality display device has a head-up display or a display in at least one mirror of the transportation vehicle.

17. The method of claim 10, wherein the detection of the driving situation is based on data from a sensor device of the transportation vehicle, based on navigation information or based on information received by a data transmission unit.

18. A non-transitory computer-readable storage medium with instructions which, when executed by a computer, cause the computer to execute a method for controlling a display of an augmented reality display device for a transportation vehicle, the method comprising:
    detecting a driving situation in which a warning is to be displayed to a driver of the transportation vehicle;
    generating virtual objects for display by the augmented reality display device, wherein the virtual objects have moving graphical elements which simulate movement of the virtual objects; and
    outputting the virtual objects for display by the augmented reality display device to enable visualization of possible imminent events, actions or hazardous situations via the augmented reality display device,
    wherein the virtual objects displayed on the augmented reality display device include representations of actual objects in an environment surrounding the vehicle, virtual objects that indicate an increased risk of objects depicted by the virtual objects actually being present in the environment surrounding the transportation vehicle, and virtual objects providing instruction for the driver to drive the transportation vehicle to position the transportation vehicle relative to locations within the environment surrounding the transportation vehicle so as to assist the driver to follow transportation vehicle navigation instructions issued by a navigation system of the transportation vehicle or parking maneuvering assistance instructions generated by the transportation vehicle.

19. The non-transitory computer readable storage medium of claim 18, wherein the moving graphical elements form a group of light points that for a virtual object.

20. The non-transitory computer readable storage medium of claim 18, wherein at least one of the virtual objects represents an actual or potential hazardous object in the environment of the transportation vehicle.

21. The non-transitory computer readable storage medium of claim 20, wherein a position or a movement of the at least one virtual object representing the actual or potential hazardous object does not coincide with a position or movement of an actual hazardous object.

22. The non-transitory computer readable storage medium of claim 20, wherein the actual hazardous object is a road user or an obstacle.

23. The non-transitory computer readable storage medium of claim 20, wherein the potential hazardous object is a road user or an obstacle.

24. The non-transitory computer readable storage medium of claim 18, wherein the augmented reality display device has a head-up display or a display in at least one mirror of the transportation vehicle.

25. The non-transitory computer readable storage medium of claim 18, wherein the detection of a driving situation in which a warning for a driver of the transportation vehicle is to be displayed takes place based on data from a sensor device of the transportation vehicle, based on navigation information or based on information received by a data transmission unit.

* * * * *